April 5, 1966   R. F. CLARK ETAL   3,244,738
TRIS(TRIPHENYLPHOSPHINE) NICKEL MONOCARBONYL
AND SIMILAR COMPOUNDS
Filed Aug. 22, 1960

REACTION 1 e.g.
1 $Ni(CO)_4$
3.5 $(\phi O)_3 P$
(paraffinic solvent b.p. 131.8)

0–5°
(0.25 –10 HRS.)
10–100° e.g.
<40°C until no $Ni(CO)_4$ as such remains 0.5–20 HRS.

ROUTE 1a e.g.
reflux 1 hr., then remove solvent

50–150°
0.1–4 HRS.

REACTION 2 e.g.
1 $(\phi O)_3 PNi(CO)_3$
2.2 $(\phi O)_3 P$
(paraffinic solvent optional)

ROUTE 1b   ROUTE 2a e.g.
slowly heat to 130°
(below b.p. of solvent)

60–180° e.g.
hold at 130° 8 hrs.

60–180°
2–20 HRS.

cool to room t., filter off crystals

REACTION 3 e.g.
1 $[(\phi O)_3 P]_2 Ni(CO)_2$
1.1 $(\phi O)_3 P$
(paraffinic solvent optional)

SOLVENT   NO SOLVENT

ROUTE 2b   ROUTE 2c e.g.
reflux, then remove solvent

50–150°
0.1–4 HRS.

recovery, including aqueous alkali wash e.g.
170°–180° 2hrs.
110–120 mm Hg

60–180°
0.25–8 HRS.
0.001–250 mm

INVENTORS

REGINALD F. CLARK
CHARLES D. STORRS

BY
Beale and Jones ATTORNEYS

United States Patent Office 3,244,738
Patented Apr. 5, 1966

3,244,738
TRIS(TRIPHENYLPHOSPHINE) NICKEL MONO-
CARBONYL AND SIMILAR COMPOUNDS
Reginald F. Clark and Charles D. Storrs, Lake Charles,
La., assignors, by mesne assignments, to Columbian
Carbon Company, a corporation of Delaware
Filed Aug. 22, 1960, Ser. No. 50,969
3 Claims. (Cl. 260—439)

This application involves improved methods of making derivatives of nickel tetracarbonyl in which three of the carbon monoxide groups are replaced by certain organic compounds of the elements of group VA of the long or Bohr periodic table, which elements are in the trivalent state, and have an atomic weight between about 30 and 122. Specifically, these are the organophosphine, organophosphite, organoarsine, organoarsenite, organostibine, or organoantimonite compounds.

One specific aspect of the invention relates to improvements in important and basic discoveries of Lamberto Malatesta and Adriano Sacco [Ann. Chem. (Rome) 44, 134–138 (1954)], concerned with two methods for preparing compounds which may be represented by the following formula wherein the lines of dots or periods represent coordination bonds rather than ordinary valences:

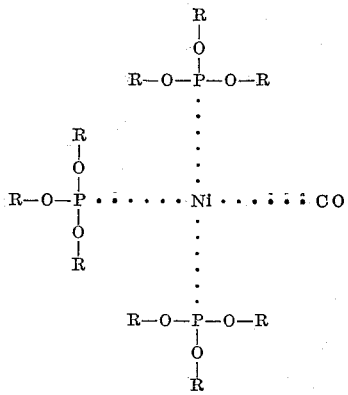

FORMULA I in which R is a hydrocarbon or substituted hydrocarbon radical. The methods of Malatesta et al. give good yields of certain of the compounds, provided careful recovery and purification steps are used.

The two types of reactions mentioned above and which are assumed to take place may be represented by the following formulas:

(A) $Ni(CO)_4 + 3(RO)_3P \longrightarrow [(RO)_3P]_3Ni(CO) + 3CO$ (B) $[(RO)_3P]_2Ni(CO)_2 + (RO)_3P \longrightarrow [(RO)_3P]_3Ni(CO) + CO$ Malatesta et al., suggest benzene or xylene as solvents for the second reaction to dissolve the reactants. For reaction (A), these prior investigators used the mole ratios of the formula, as well as excesses of one and two moles of the phosphite, and used no extraneous solvent.

It has been found according to the invention that these compounds are made with improved yields and purity of product, and shortened reaction times are obtained provided certain procedures, separately or in combination, are followed. Also, it is possible to synthesize compounds suggested by the prior art as incapable of being formed, and it has been found that heretofore unknown compounds are readily formed; this is one aspect of the invention.

It has been discovered that when a vacuum is applied or continued with heating of the reaction mixture after solvent is removed if present, the reaction is improved still further as compared with the same conditions but at atmospheric pressure.

A further improvement is in the method of removing impurities from the final product. This is accomplished by steps including washing the crystalline or liquid product with slightly alkaline water, rather than recrystallizing from organic solvents or extracting impurities with similar solvents where the product is liquid. If the latter procedures are used also, the extent of these operations is reduced by using the purification procedure of this invention.

The compounds prepared according to the methods of this invention may be represented by the following general formula:

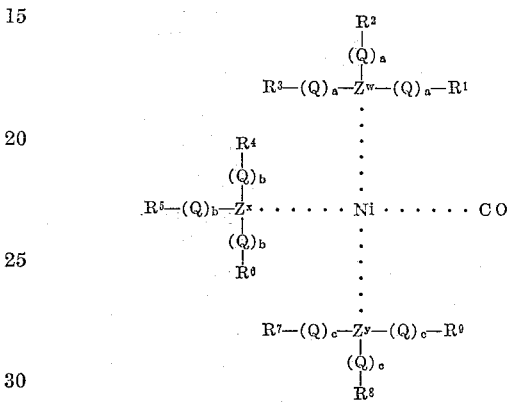

FORMULA II wherein $R^1$ through $R^9$ are the same or different and are hydrogen, hydrocarbon or substituted hydrocarbon radicals; Q is oxygen or sulfur, $a$, $b$ and $c$ are 0 or 1, independently of one another; and $Z^w$, $Z^x$, and $Z^y$ are the same or different and are one or more of the elements selected from the group consisting of P, As, and Sb. For any one Z of Formula II, one of the radicals R may be hydrogen, where $a$, $b$, or $c$ is 1. This formula includes compounds which the prior art suggests are difficult to obtain or are not obtained using prior procedures, as well as new compounds, and the compounds of Formula I. Not all $a$'s, $b$'s, or $c$'s need be the same; for instance, $C_6H_5As(OCH_3)_2$ or $R^1Z(OR^2)_2$ is comprehended by Formula II.

The radicals $R^1$ through $R^9$ (hereinafter collectively called R) are organic radicals (with the exception of hydrogen, see below), preferably consisting of hydrogen and carbon, that is, the hydrocarbon radicals. Other useful organic radicals are the substituted hydrocarbons, the substituents being made up of hydrogen and carbon, halogen, nitrogen, and/or oxygen. Also, one or more of $R^1$ through $R^9$ may be a cyclic or heterocyclic radical; thus a single cyclic radical may comprise more than one R. Examples of open-chain alkyl radicals, preferably having less than about 20 carbon atoms, as the radical R, are methyl, ethyl, propyl, butyl, hexyl, dodecyl, isooctyl, isobutyl, and isopentyl. Useful cycloalkyl hydrocarbon radicals include cyclopentyl, cyclohexyl, cyclooctyl, and similar groups. Representative aryl radicals are phenyl, biphenyl, α-naphthyl, and β-naphthyl.

Suitable halogens are chlorine, fluorine, bromine and iodine. Examples of halogen substituted radicals are p-chlorophenyl, 2-chloroethyl, m-(trifluoromethyl)phenyl, bromocyclohexyl, 1-iodopropyl, and similar radicals. Representative alkylaryl radicals are m-tolyl, p-tolyl, o-tolyl, and 3,5-xylyl. Arylalkyl radicals according to the invention are represented by the benzyl and benzhydryl radicals. Other useful substituted hydrocarbon radicals include p-methoxyphenyl and p-acetophenyl. Known homologous radicals provide further useful variants. Heterocyclic radicals which are useful include tetrahydrofurfuryl and pyridyl. As may be seen from the foregoing and from the matter appearing hereinafter, the radicals "R" are selected from the group consisting of alkyl, aryl, alkaryl, aralkyl and cycloalkyl radicals, halogen substituted derivatives thereof, alkoxyaryl radicals, nitroaryl radicals, the tetrahydrofurfuryl radical, the pyridyl radical, and the hydrogen radical. As stated above, the radicals preferably have less than about 20 carbon atoms.

When the substitution compound is a phosphite or the analogous oxygen-bearing arsenic or antimony compound, hydrogen may be substituted for one R. Examples of this type of compound are dibutylhydrogenphosphite and bis(2-ethylhexyl) hydrogen phosphite.

The oxygen atom of the phosphites and the analogous arsenic and antimony compounds may be replaced by sulfur atoms to produce the respective thio compounds. One example of this type of compound is triphenylthiophosphite.

Also within the scope of this invention are phosphites with the phosphorous atom in a ring system, such as ethyl o-phenylenephosphite and p-tolyl o-phenylenephosphite.

Examples of compounds wherein the radicals are the same are tris(triphenylphosphite) nickelmonocarbonyl, tris(tri-p-tolylphosphite) nickelmonocarbonyl, tris(tri-2-chloroethylphosphite) nickelmonocarbonyl, tris(triphenylphosphine) nickelmonocarbonyl, tris(tricyclohexylphosphine) nickelmonocarbonyl, and similar compounds within the above-defined formulas. Instances of catalysts prepared so that the radical "R" varies within a given catalyst are bis(triphenylphosphite)tritolylphosphite nickelmonocarbonyl, bis(triphenylphosphite)triethylphosphite nickelmonocarbonyl, and tris(mixed 2-ethylhexyloctylphenylphosphite) nickelmonocarbonyl. Similar variations may be made where phosphine compounds are utilized, and both phosphine and phosphite compounds may be bonded to the Ni°. Examples of such compounds are bis(triphenylphosphite)triphenylphosphine nickelmonocarbonyl, and bis(triphenylphosphine) triphenylphosphite nickelmonocarbonyl. Comparable compounds derived from $Ni(CO)_4$ but with arsines, arsenites, stibines, and/or antimonites substituted for the phosphines and phosphites are useful.

Representative reactions, leading to the formation of the compounds having Formula II, are as follows, using the general symbol R for $R^1$ through $R^9$ and general symbol Z for $Z^w$, $Z^x$, $Z^y$:

(1)  $Ni(CO)_4 + 3(RO)_3Z \rightarrow [(RO)_3Z]_3NiCO + 3CO$ and $Ni(CO)_4 + 3R_3Z \rightarrow (R_3Z)_3NiCO + 3CO$ (2)  $[(RO)_3Z]Ni(CO)_3 + 2(RO)_3Z \rightarrow [(RO)_3Z]_3NiCO + 2CO$ and $(R_3Z)Ni(CO)_3 + 2R_3Z \rightarrow (R_3Z)_3NiCO - 2CO$ (3)  $[(RO)_3Z]_2Ni(CO)_2 + (RO)_3Z \rightarrow [(RO)_3Z]_3NiCO + CO$ and $(R_3Z)_2Ni(CO)_2 + R_3Z \rightarrow (R_3Z)_3NiCO + CO$ Using suitable radicals $R^1$ through $R^9$, and suitable elements $Z^w$, $Z^x$, and $Z^y$, various compounds corresponding to Formula II are formed.

The mole ratios of reactants are important; for reaction (1), a stoichiometric excess of $(RO)_3Z$ or $R_3Z$ should be used in the amount of about 20 to 70% by weight. For reactions (2) and (3), this stoichiometric excess should be only between about 5% and 15%.

Useful reactant compounds, according to the applicable formula for the substituents $(R^{1-9}O_{0-1})_3Z$ include the following, having the properties indicated where they are known:

| Compound | Formula Weight | Physical Form, 20° C. | Approx. Boiling Point, °C. | Approx. Melting Point, °C. |
|---|---|---|---|---|
| Trimethylphosphine | 76.08 | Liquid | 40–42 | |
| Trimethylphosphite | 98.01 | do | [1] 111–12 | |
| Trimethylarsine | 120.01 | do | 52.8 | |
| Trimethylstibine | 166.86 | do | 80.6 | |
| Trimethylantimonite | 214.79 | Solid | | [1] 123–4 |
| Triethylphosphine | 118.16 | Liquid | 127.5 | |
| Triethylphosphite | 116.16 | do | 155.7 | |
| Triethylarsine | 162.09 | do | 140 | |
| Triethylstibine | 208.94 | do | 158–9 | −29 |
| Triethylantimonite | 256.82 | do | [1] 103$^{18 mm}$ | |
| Triphenylphosphine | 262.28 | Cryst | 360 | 79 |
| Triphenylphosphite | 310.28 | Liquid | 360 | |
| Triphenylarsine | 306.21 | Cryst | 360($CO_2$) | 59 |
| Triphenylstibine | 353.06 | Cryst | 360 dec. | |
| Triphenylantimonite | 400.94 | | | |
| Tri-p-tolylphosphite | 352.19 | Liquid | [1] 410 | |
| Tri-p-chlorophenylphosphite | 413.54 | Solid | [1] 450 | 49 |
| Tricyclohexylphosphite | 328.16 | do | | 20 |
| Tri-m-tolylphosphite | 352.19 | Liquid | [1] 400 | |
| Tri-1-naphthylphosphite | 460.28 | Cryst | | [1] 91 |
| Tri-2-naphthylphosphite | 460.28 | Cryst | | [1] 94 |
| Tribenzylphosphite | 352.19 | Liquid | | |
| Tri-m-(trifluoromethyl)-phenylphosphite | 514.19 | do | | |
| Trisdiphenylphosphite | 538.34 | Cryst | | [1] 95 |
| Tri-3,5,xylylphosphite | 394.22 | Liquid | | |
| Tri-o-chlorophenylphosphite | 413.54 | do | [1] 430 | |
| Tri-o-tolylphosphite | 352.19 | do | [1] 390 | |
| Tri-p-methoxyphenylphosphite | 400.19 | do | [1] 445 | |
| Mixed 2-ethylhexyl octylphenylphosphite | | do | | |
| Tri-2-chloroethylphosphite | 221.42 | do | [1] 280 | |
| Tribenzhydrylphosphite | 580.37 | | | |
| Triisobornylphosphite | 490.28 | | | |
| Tri-2-mesitylphosphite | 436.25 | Cryst | | |
| Tri-p-acetophenylphosphite | 436.22 | Liquid | | |
| Triisooctylphosphite | 418.22 | | | |
| Tri-p-nitrophenylphosphite | 445.19 | | | [1] 170–1 |
| Dibutyl hydrogen phosphite | 194.2 | Liquid | 118–9$^{7 mm}$ | |
| Bis(2-ethylhexyl) hydrogen phosphite | 306.4 | do | 163–4$^{3 mm}$ | |
| Ethyl o-phenylene phosphite | 184.1 | Solid | 83–5$^{11 mm}$ | 142–5 |
| p-Tolyl-o-phenylene phosphite | 246.1 | do | 164–5$^{12 mm}$ | 25 |
| Triphenylthiophosphite | 357.5 | do | | 76–7 |

[1] Literature value.

The other starting material, nickel carbonyl, has certain characteristics which are of interest for successful practice of the invention. The valence state of the nickel atom in nickel tetracarbonyl is considered to be zero, since the carbon monoxide groups are held only by coordination bonds. Nickel carbonyl melts at about −25° C. and boils at about 43° C. The pure compound requires care in its use as is known, since it explodes when heated to 60° C. at atmospheric pressure, and it is extremely toxic. At higher pressures there is less danger of decomposition of this coordination compound; for example, under a pressure of 100 atmospheres, pure nickel carbonyl does not decompose when heated to a temperature of 250° C. The properties of carbon monoxide are of interest in connection with the invention, since it is one of the products of reaction. It has a boiling point of about −192° C., the critical temperature is −139° C., and the critical pressure is 35 atmospheres.

Each of the reactions under (1), (2), and (3) above is conducted in a plurality of steps or stages, as shown generally in the flow sheet of the drawing. Each step is preferably carried out at atmospheric pressure or at a lower pressure, where indicated.

Reaction (1), according to the invention, is always initiated in the presence of a solvent. In the absence of solvent during the initial stages of reaction (1) relatively low yields of the desired compound of Formula II are obtained, and the product contains substantial proportions of the di-substituted product, such as $[(RO)_3Z]_2Ni(CO)_2$, or $(R_3Z)_2Ni(CO)_2$ where the reaction is conducted for a reasonable period of time. The improvement is even more notable when a vacuum is applied as taught herein. The steps for conducting this reaction include, in general, adding nickel carbonyl, a saturated hydrocarbon solvent, and at least one second reactive component, $(RO_{0-1})_3Z$, to a reaction vessel, all of the materials being at a low temperature, such as at 0–5° C., and in a first stage, gradually heating the mixture while allowing for venting of carbon monoxide and retaining nickel carbonyl. In a second stage, after the carbon monoxide of the nickel carbonyl has been partially replaced, the temperature is raised to a point above that at which nickel carbonyl would be retained.

The first stage of reaction (1) is commenced in the cooled reaction mixture and continues as it is warmed, the rate of reaction increasing with the temperature. The temperature is increased to a point below about 40° C., such as room temperature, and held there until the first stage of reaction (1) is practically complete as evidenced by a marked decrease in the rate of evolution of carbon monoxide. During this first stage, temperatures above about 40° C. may be used only if provisions are made for maintaining the required amount of nickel carbonyl in the reaction zone, and for removing the evolved carbon monoxide. Refluxing, and/or reaction under pressure if carbon monoxide is removed, permit conducting the first stage of the reaction at temperatures up to about 55° C., or up to about 100° C. if under sufficient pressure and provision for removing carbon monoxide is made. At about 60° C. and atmospheric pressure the nickel carbonyl decomposes, as indicated above, and this must be taken into consideration. The time taken to reach the reaction temperature, suitably between about 10° C. and 100° C., in the first stage of reaction (1) is between about .25 and 10 hours, and this temperature is maintained until a definite drop in the rate of evolution of carbon monoxide occurs, usually within 0.5 to 20 hours.

In the few instances where nickel carbonyl boils at a temperature higher than the boiling point of the other reactant material, such as trimethylphosphine (B.P. 40–42° C.) suitable measures are taken to retain the reactants and solvent in the reaction vessel while venting carbon monoxide.

After most or all of the nickel carbonyl is reacted in the first stage of reaction (1), it is continued in one of two ways, shown in the drawing as routes (1a) and (1b). Both of these routes involve raising the temperature of the intermediate reaction mixture from the first stage to a point considerably above the temperature of the first stage, thus decomposing or volatilizing any nickel carbonyl which remains, and continuing the reaction. During the next stages of the reaction, at least the bulk of the excess reactant $(RO_{0-1})_3Z$ is believed to replace additional carbon monoxide groups, the intermediate mixture being such that the reaction products are compounds in which one or two of the carbon monoxide groups have been replaced. Such hypotheses or theories as the foregoing, wherever set forth herein, are not intended to limit the invention thereto; they are offered as possible explanations of the principles or mechanisms involved. These principles or mechanisms are not fully known.

Following route (1a), after the first stage, the intermediate product is heated to a higher temperature, for example approaching or at the boiling point of the solvent, preferably about 50° to 150° C., and held at that point for a substantial period, as between about 0.1 and 4 hours. The temperature is preferably below the boiling point of the reactants then present; otherwise refluxing or other measures are used to retain the reactants. This temperature, of course, is below that at which the remaining reactant materials in the intermediate mixture, or the end product, undergo decomposition. The solvent may be removed before, during, or after the temperature adjustment.

After the step of providing an increase in temperature, the reduced pressure is applied and maintained while heating, preferably to a still higher temperature, which is maintained for the required period of time to substantially complete the formation of the compound of Formula II. Preferably, this temperature is between about 60° and 180° C., and the time between about .25 and 8 hours. As suggested above, the temperature to which the solvent-free mixture is subjected depends upon the reactants present (other than nickel carbonyl, which has been fully reacted or any excess removed after completion of the first stage).

For example, one desirable end product, tris(triphenylphosphite) nickelmonocarbonyl has a melting point of about 98.5° C. Using reaction (1) this would be prepared from nickel carbonyl and triphenylphosphite. One of the possible intermediates, bis(triphenylphosphite) nickeldicarbonyl has a melting point of about 99° C. The triphenylphosphite, present in excess after the first stage of the reaction, has a boiling point of about 360° C. at atmospheric pressure. For any of the components present during the application of vacuum, the boiling point thereof, at the reduced pressure used, is desirably not exceeded.

The alternative mode of conducting the reactions under (1) is shown as route (1b) in the flow sheet. After the first stage at the point where no substantial quantity of nickel carbonyl as such remains, the reaction is completed in the presence of solvent and preferably without application of a vacuum. Following route (1b), it is important to not only gradually increase the temperature to a point at least above the melting point of the reactants and reaction product, but to maintain the elevated temperature for a period of time sufficient to obtain substantially complete conversion of the intermediate reaction mixture to the desired tri-substituted product. If the reaction is of short duration the end product will be a mixture comprising a large proportion of the bi-substituted product. As indicated above, the preferred solvent is a saturated hydrocarbon, however, aromatics may be used but are not preferred since the products tend to decompose in aromatic solvents. This time is usually between about 2 hours and 20 hours.

The temperature to which the intermediate reaction mixture (after the first stage) from reaction (1) is subjected is suitably between about 60° and 180° C., according to route (1b).

Reactions 2 and 3 are conducted similarly to the last stages of reaction (1). Although a paraffinic solvent may be used initially in reaction (2), it is preferred to omit it if a relatively homogenous reaction mixture can be achieved in its absence. Where such solvent is used, route (2a) follows the same general procedure as route (1b) described above, and route (2b) is similar to the procedure given for route (1a). Following route (2c) is preferred. No solvent is used, and the reaction mixture is heated to the reaction temperature before or after application of the vacuum. This temperature is between about 60° C. and 180° C., and it is maintained for from about .25 to 8 hours. Even though carbon monoxide is extremely volatile at the temperatures encountered, the use of a reduced pressure markedly increases the rate of reaction. The use of vacuum also makes the reaction temperature less critical, thereby allowing high purity products to be produced time after time with reproducible results. The procedure for purifying the impure liquid or crystalline product of Formula II comprises the step of washing the product with an aqueous solution of an alkali metal hydroxide, said solution having a pH of between about 7.5 and about 12.5. Preferably the aqueous liquid washing step is preceded by a step of washing the product with a lower liquid alkanol, such as methanol, absolute or comprising water. The alkanol wash may be omitted, or may follow the step of washing with alkaline water.

The alkanol, if used, is liquid at the temperature used, suitably between 0° C. and 50° C. For products which are alcohol-soluble, dilution of the alkanol with water is desirable, or the alkanol washing is omitted. Suitable alkanols include liquid monohydric alkanols having from one to twelve carbon atoms, as well as polyhydric alkanols such as glycerol and ethylene glycol.

The preferred alkaline compound is sodium hydroxide, although other alkali metal hydroxides such as potassium hydroxide are equally useful.

The desired properties of the solvent used during reaction (1) and optionally used during reactions (2) and (3) are:

(a) it is liquid at temperatures and pressures used in the reaction during its presence, or is capable of being refluxed at such temperatures;
(b) its boiling point is above 43° C., that of $Ni(CO)_4$, and below the boiling point or decomposition temperature and above the melting point of the other reactants and the compound of Formula II;
(c) it is inert with respect to the reactants and product.

Aromatic solvents such as benzene and toluene fulfill most of the above requirements, but have been found to give less satisfactory results than saturated hydrocarbon solvents. For some reason, possibly involving a reaction with the product or the reactants, benzene, toluene, and the xylenes appear to reduce the yield of the desired product. On the other hand, certain saturated hydrocarbon solvents have all of the above desired properties, including being completely inert with respect to the reactants and product. By way of example, methylcyclohexane (B.P. 100.9° C.) and ethylcyclohexane (B.P. 131.8° C.) are well adapted for use in preparing tris(triphenylphosphite) nickelmonocarbonyl. Other saturated hydrocarbon solvents are useful, and are chosen according to the above criteria. These include hexane, heptane, octane, cyclopentane, methylcyclopentane, dimethylcyclopentane, ethylcyclopentane, cyclohexane, dimethylcyclohexane, methylethylcyclohexane, admixtures of similar cycloalkanes sometimes called naphthenes, and similar materials. Of the above criteria, the more important ones are that the boiling point be above that of nickel carbonyl to reduce the likelihood that this material is occluded in crystals of the product, that the solvent boils at a temperature lower than that at which the product boils or decomposes, and that it is inert and liquid under the conditions used when it is present.

The vacuum should be as low as is practicable, a suitable range being 0.001 to 250 mm. of mercury. If desired, pressures higher than 250 mm. and below atmospheric pressure may be used, but they are less efficient than the lower pressures. The extent of the pressure reduction is such that the materials in the reaction mixture are not vaporized, with the exception of nickel carbonyl and solvent as will be discussed hereinbelow. The effect of the reduced pressure is not fully understood, since the critical temperature of carbon monoxide is so low that it should be freely evolved at atmospheric pressure as soon as it is liberated in the reaction. It has been discovered, however, that simply applying heat and vigorous agitation, and venting to the atmosphere gives less desirable results. The use of a reduced pressure substantially below atmospheric pressure markedly reduces the reaction time, and gives a greater yield of purer product of Formula II, as compared with identical conditions but at atmospheric pressure.

For the reactions in which the solvent is used, the vacuum is suitably applied before evaporating the solvent to assist in the removal, although the alternative of evaporating the solvent at atmospheric pressure, then applying the vacuum, is useful. To reiterate, the reduced pressure is applied or continued after removal of the solvent, as distinguished from the usual expedient of terminating the vacuum and heating as soon as solvent is removed.

The following examples illustrate the invention.

*Example 1*

A 3-liter, 4-necked flask is equipped with a stirrer, a water condenser, a Dry Ice acetone Dewar type condenser, a 200 ml. dropping funnel and an inlet tube and provisions made to cool the flask to about 0° C. with an ice bath.

Four hundred ml. of ethyl cyclohexane (B.P. 131.8) was added to the flask while cooling to 0°–5° C. The flask was maintained at this temperature during the addition of reactants. In a trap connected to the inlet tube, 35 ml. (0.27 mole) of $Ni(CO)_4$ was condensed and transferred to the flask. (The $Ni(CO)_4$ was condensed in a trap maintained at —15° to —18° C. with Dry Ice in acetone.) To the cooled $Ni(CO)_4$ in ethyl cyclohexane a mixture of 1150 g. (3.7 mole) triphenylphosphite in 600 ml. of ethyl cyclohexane was added dropwise over a 5½ hour period. During this period 35 ml. additional $Ni(CO)_4$ was condensed and transferred to the flask after the addition of phosphite was ⅛ complete. When ¼ of the phosphite had been added an additional 70 ml. of $Ni(CO)_4$ was condensed and transferred to the flask making a total of 140 ml. (1.08 mole) $Ni(CO)_4$. The reaction flask was allowed to warm to room temperature and stirring continued for 15 hours. Nitrogen was then introduced in the flask and the mixture gradually heated to 130° C. over an 8 hour period. After reaching 130° C. the mixture was heated with stirring for an additional 24 hours.

The reaction mixture was cooled to room temperature upon which white crystals formed. The crystals were filtered to remove ethyl cyclohexane and air dried. The crystals were then slurried at 40° C. for 2 hours with 10 liters of water adjusted to a pH of about 9 with NaOH. The crystals were filtered, washed with water and dried under vacuum. If, upon drying, a phenolic odor persists, the crystals were again slurried with water plus NaOH at 40° C. and rewashed. There is recovered 1070 g. (97.3% yield based on $Ni(CO)_4$) of tris(triphenylphosphite) nickel monocarbonyl which is about 96% pure as determined by infrared analysis.

*Example 2*

One hundred ml. of methyl cyclohexane (B.P. 100.9) was added to the flask while cooling to 0°–5° C. The flask was maintained at this temperature during the addition of reactants. In a trap connected to the inlet tube, 20 ml. of $Ni(CO)_4$ was condensed and transferred to the flask. (The $Ni(CO)_4$ was condensed in a trap maintained at —15° to —18° with Dry Ice in acetone.) To the cooled $Ni(CO)_4$ in methyl cyclohexane a mixture of 160 g. triphenylphosphite in 125 ml. of methyl cyclohexane was added dropwise over a one hour period. The mole ratio of triphenylphosphite to $Ni(CO)_4$ was 3.4 to 1. The reaction flask was allowed to warm to room temperature and heated to reflux (100° C.) for one hour.

The solvent (methylcyclohexane) was then removed by vacuum while keeping the temperature at 100° C. After removal of the solvent, the temperature was increased to 170–180° at a pressure of 110 mm.–120 mm. Hg and stirring continued for 2 hours. Upon cooling the reaction mixture solidified. This solid was broken up and removed from the flask. The crystals were slurried with 300 ml. of absolute MeOH, filtered, and air dried. The crystals were then slurried at 40° C. for one hour with two liters of water adjusted to a pH of about 9 with NaOH. The crystals were filtered, washed with water and dried under vacuum. If, upon drying, a phenolic odor persists, the crystals were again slurried with water plus NaOH at 40° C. as above and rewashed. There is recovered 147 g. 93.5% yield based on $Ni(CO)_4$ of tris (triphenylphosphite) nickel monocarbonyl which is 99.7% pure as determined by infrared.

In place of the $Ni(CO)_4$ used, the starting material could be $(C_6H_5O)_3PNi(CO)_3$ or $[(C_6H_5O)_3P]_2Ni(CO)_2$. However, if these compounds are used, the triphenylphosphite used should only be 5–20% above the stoichiometric amount necessary to obtain $[(C_6H_5O)_3P]_3NiCO$.

Example 1 follows route (1b) and Example 2 follows route (1a) as shown in the flow sheet. Both are concerned with reaction (1). For the same end product, the latter portions of these examples are followed where reactions (2) and (3) are concerned, with modifications as described herein.

Difficulties have been experienced in analyzing the products, since the melting points of the bi-substituted and tri-substituted products are sometimes close to one another. Such analysis is simplified by using infrared spectra. The product is dissolved in carbon tetrachloride or chloroform and subjected to said analysis. For the compound $[(C_6H_5O)_3P]Ni(CO)_3$, there were three "carbonyl peaks" at wave lengths in microns of about 4.80, 4.87, and 4.96. For the compound $$[(C_6H_5O)_3P]_2Ni(CO)_2$$

two carbonyl peaks at wave lengths of about 4.87 microns and 4.96 microns were recorded. The compound $[(C_6H_5O)_3P]_3NiCO$ gave a single peak for carbonyl at about 4.95 microns. The above values were with $CCl_4$ solvent using a Baird-Atomic Infra Red Spectrometer, Model 455.

The compounds prepared according to the invention are useful as catalysts as taught by the copending application of Harold Shechter, Serial No. 84,766, filed January 25, 1961, and now abandoned, in which the tri-substituted compounds are utilized to catalyze, for instance, the reaction of butadiene to form cyclooctadiene. Other examples of the use of related compounds appear in Benson Patents 2,839,510 and 2,894,936, wherein such compounds are catalysts for the preparation of unsaturated derivatives of cyclohexane, cyclooctane, and derivatives of octahydronaphthalene from allene and allene derivatives.

We claim:
1. A process of purifying an impure compound of the formula

$$(R^1Q_aR^2Q_aR^3Q_aZ^w)(R^4Q_bR^5Q_bR^6Q_bZ^x)(R^7Q_cR^8Q_cR^9Q_cZ^y)Ni(CO)$$

where $R^1$, $R^2$, $R^3$, $R^4$, $R^5$, $R^6$, $R^7$, $R^8$, and $R^9$ are selected from the group consisting of alkyl, aryl, alkaryl, aralkyl, and cycloalkyl radicals, halogen substituted derivatives thereof, alkoxyaryl radicals, nitroaryl radicals, said radicals having less than about 20 carbon atoms, the tetrahydrofurfuryl radical, the pyridyl radical, and the hydrogen radical; Q is selected from the group consisting of oxygen and sulfur; $Z^x$, $Z^y$, and $Z^w$ are each chosen from the group consisting of P, As, and Sb; and $a$, $b$, and $c$, independently, are selected from the numbers 0 and 1; comprising the step of washing said impure compound with an aqueous solution of an alkali metal hydroxide, said solution having a pH between about 7.5 and 12.5.

2. The process of claim 1 in which said step is accompanied by a step comprising washing said impure compound with a lower liquid alkanol, in which it is insoluble.

3. Tris(triphenylphosphine)nickelmonocarbonyl.

References Cited by the Examiner
UNITED STATES PATENTS 2,968,665  1/1961  Mahler _____ 260—439

FOREIGN PATENTS 834,991  3/1952  Germany.
841,589  6/1952  Germany.

OTHER REFERENCES

Irvine et al.: Science, vol. 113, pages 742–743 (1951).

Malatesta et al.: Annali Di Chimica, 44, No. 1–6 (1954), pp. 134–138.

Malatesta et al.: Journal of the Chemical Society (London) (1958) p. 2324.

Meriwether et al.: J.A.C.S., vol. 81, pages 4200–4208, August 20, 1959.

SAMUEL H. BLECH, *Primary Examiner.*

ABRAHAM H. WINKELSTEIN, TOBIAS E. LEVOW,
*Examiners.*